(12) United States Patent
Vasquez et al.

(10) Patent No.: US 10,931,786 B1
(45) Date of Patent: Feb. 23, 2021

(54) DYNAMIC CONTENT PLACEMENT FOR CONTENT DELIVERY NETWORKS

(71) Applicant: Amazon Technologies, Inc., Seattle, WA (US)

(72) Inventors: Jorge Peixoto Vasquez, Mercer Island, WA (US); Chaitanya Ashok Solapurkar, Belmont, MA (US); Mukul Gupta, Seattle, WA (US); Anubhav Gupta, Bellevue, WA (US); Vineet Ghatge Hemantkumar, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/836,011

(22) Filed: Mar. 31, 2020

(51) Int. Cl.
*G06F 15/173* (2006.01)
*H04L 29/08* (2006.01)
*H04L 29/12* (2006.01)
*H04L 12/707* (2013.01)
*H04L 12/26* (2006.01)

(52) U.S. Cl.
CPC ........ *H04L 67/327* (2013.01); *H04L 61/1511* (2013.01); *H04L 67/2847* (2013.01)

(58) Field of Classification Search
USPC ................ 709/218, 242, 245, 219, 223, 203
See application file for complete search history.

(56) References Cited

U.S. PATENT DOCUMENTS

| 8,195,837 | B2 * | 6/2012 | McCarthy | H04L 61/1511 709/245 |
| 8,199,752 | B2 * | 6/2012 | Swanson | H04L 45/125 370/389 |
| 8,291,117 | B1 * | 10/2012 | Eggleston | H04L 61/2007 709/245 |
| 8,612,450 | B1 * | 12/2013 | Proffit | H04N 21/4828 707/740 |
| 10,033,627 | B1 * | 7/2018 | Howard | H04L 43/16 |
| 10,091,096 | B1 * | 10/2018 | Howard | H04L 45/22 |
| 10,097,448 | B1 * | 10/2018 | Howard | G06F 16/9574 |

* cited by examiner

*Primary Examiner* — Jude Jean Gilles
(74) *Attorney, Agent, or Firm* — Nicholson De Vos Webster & Elliott LLP

(57) ABSTRACT

Techniques are described for enabling a content delivery network (CDN) service of a cloud provider network to place content distributions across points of presence (PoPs) within a common geographic area in a manner that makes efficient use of the resources provided by the PoPs. A Domain Name System (DNS) service obtains log data reflecting requests to access distributions at various PoPs. The DNS service uses the log data to periodically generate characterization data for the distributions (e.g., in terms of requests per second, bytes transferred per second, and cache width usage). The DNS service uses the generated characterization data to assign particular distributions to particular PoPs of each PoP group such that the distributions are distributed across the PoPs according to the characterization data. The DNS service uses the assignments to generate routing data used by the DNS service to resolve DNS queries for particular distributions to particular PoPs of PoP groups.

20 Claims, 9 Drawing Sheets

CHARACTERIZATION DATA 144

| Group | Distribution | RPS | BPS | Unique Bytes |
|---|---|---|---|---|
| Houston | abc123.example.net | 100 | 50000 | 5 GB |
| Houston | def456.example.net | 25 | 35000 | 750 MB |
| ... | ... | ... | ... | ... |
| Seattle | abc123.example.net | 50 | 25000 | 3 GB |
| Seattle | def456.example.net | 75 | 105000 | 600 MB |
| NYC | abc123.example.net | 150 | 75000 | 110 MB |
| ... | ... | ... | ... | ... |

ANALYTICS SERVICE 106

DISTRIBUTION-TO-PoP MAPPING 302
(E.G., HOUSTON PoP GROUP)

DYNAMIC CONTENT PLACEMENT FOR CONTENT DELIVERY NETWORKS

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, also referred to herein as "data centers," may include a number of interconnected computing systems to provide computing resources to users of the data center. The data centers may be private data centers operated on behalf of an organization or public data centers operated on behalf of, or for the benefit of, the general public.

Existing routing and addressing technologies can enable multiple data centers to provide similar or identical content to client computing devices. In some instances, each data center providing a set of content may be referred to as a point-of-presence (PoP) of a content delivery system (or other organization) providing the content. Content delivery systems (sometimes referred to as "content delivery networks" or "CDNs") often attempt to connect users to a geographically "nearby" (to the user) PoP, as such connections are commonly much faster than connections between the user and geographically distant PoPs or other computing systems. Accordingly, a CDN may implement PoPs over a wide area—e.g., worldwide—and route requests for content to "nearby" PoPs for fulfillment. For example, a CDN customer can host a set of files (often referred to as a "content distribution" or simply "distribution") for a web page through the CDN. The CDN replicates ones or all of the set of files for the web page in potentially many locations, such as in a PoP in Tokyo and another PoP in London, so that a user in the United Kingdom would be served the web page from the London PoP while a user in Japan would be served the web page from the Tokyo PoP.

Each PoP is associated with an address on a computing network, such as an Internet Protocol (IP) address. However, requests for content are typically addressed to a human-readable identifier, such as a universal resource identifier (URI) or domain name. To enable use of human-readable identifiers in accessing content, client computing devices interact with a Domain Name System (DNS) that operates to resolve domain names into corresponding network addresses. Typically, a CDN is associated with one or more domain names, and an operator of a CDN will have authority to alter DNS records specifying IP addresses to which those domain names resolve. Thus, the operator of a CDN can utilize DNS records to control how requests to access content of the CDN are routed to PoPs.

BRIEF DESCRIPTION OF DRAWINGS

Various embodiments in accordance with the present disclosure will be described with reference to the drawings, in which.

DETAILED DESCRIPTION

Figure 1:
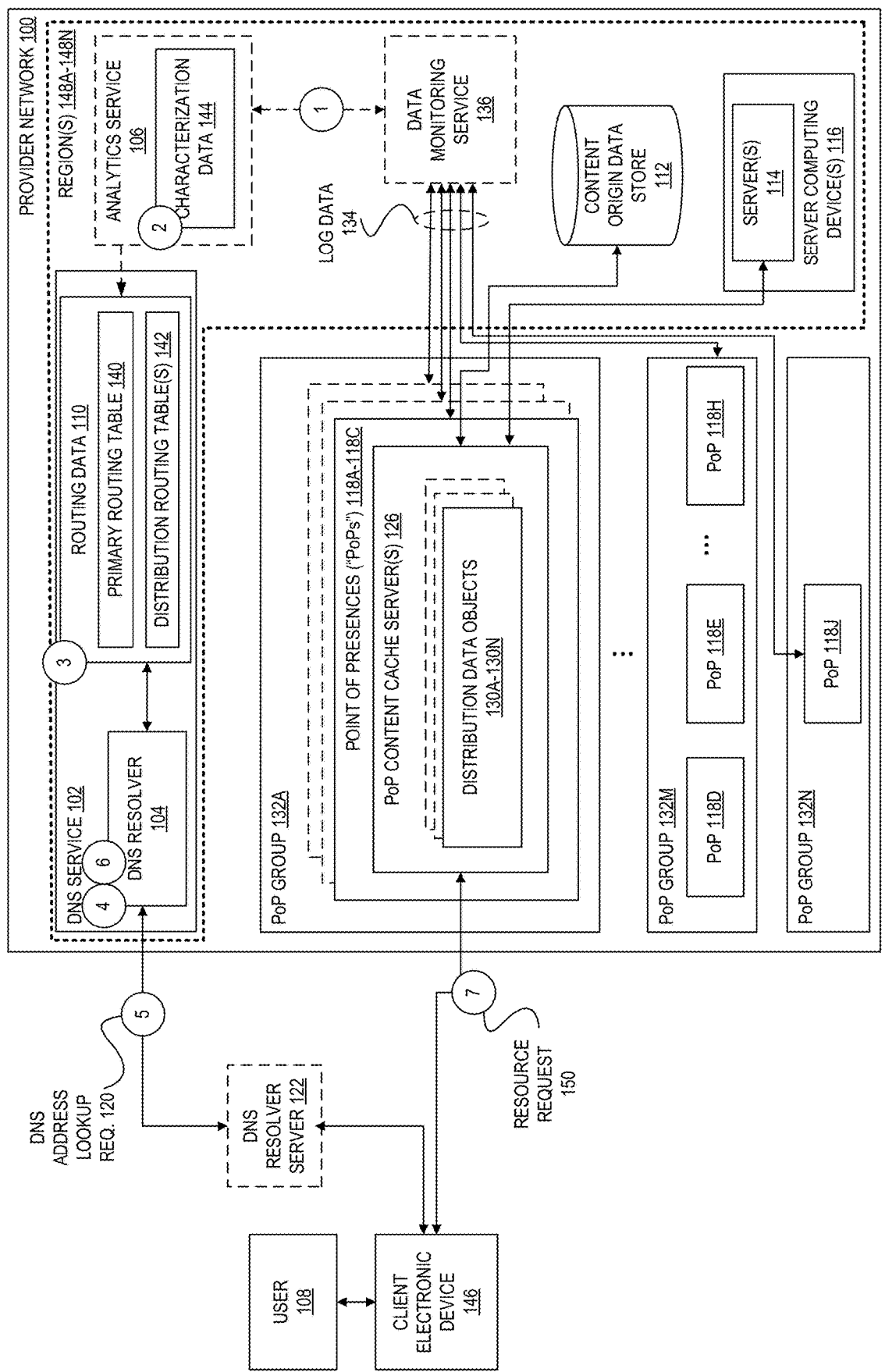
FIG. 1 is a diagram illustrating an environment in which a DNS service is configured to dynamically place content distributions at PoPs of a CDN according to some embodiments.

The present disclosure relates to methods, apparatus, systems, and non-transitory computer-readable storage media for enabling a content delivery network (CDN) service of a cloud provider network to dynamically place content distributions across points of presence (PoPs) that are relatively close to one another in terms of network access (e.g., network latency) to client devices in a common geographic area. The dynamic placement of content distributions across such PoP collections, also referred to herein as PoP groups, is performed in a manner that efficiently uses the resources provided by each of the individual PoPs of a PoP group. According to some embodiments, a cloud-based CDN service obtains log data reflecting requests from client devices to access distributions at PoPs of the CDN. The CDN service uses the log data to periodically generate characterization data for distributions managed by the CDN service, where the characterization data characterizes an amount of load associated with various distributions at each PoP group (e.g., where the load is calculated in terms of requests per second, bytes transferred per second, number of unique bytes requested, or based on other factors or combinations thereof). The CDN service uses the generated characterization data to assign particular distributions to particular PoPs of each PoP group such that the distributions are distributed across the PoPs according to the characterization data. In some embodiments, the CDN service uses the assignment of distributions to PoPs to generate routing data, including a primary routing table and a distribution routing table, that can be used by a DNS service to resolve DNS queries for particular distributions to particular PoPs of PoP groups.

Among other features, a CDN generally enables the distribution of content with low latency and high data transfer rates by serving requests using a network of edge locations, or PoPs, around the world. As use of a CDN grows in particular geographic areas, CDN operators typically scale a CDN by deploying additional PoPs at network locations that can handle the increased demand in those geographic areas. However, because the main input to a CDN's routing decision is the geographic location of DNS resolvers, which act as proxies for requesting client devices, using a latency-based DNS request routing system typically leads to duplication of content across PoPs serving a same geographic area. For example, because users in any given geographic area typically access similar content regardless of their DNS resolver (e.g., regardless of their Internet service provider (ISP)), this often leads to content duplication in the caches of PoPs in a same geographic area. This duplication of content across PoPs in a same geographic area results in wasteful usage of cache space (e.g., effectively limiting the cache width of a group of PoPs in close geographic or network proximity to that of a single PoP) and further causes the cost of increasing the served catalog size of a CDN proportional to the number of existing PoPs.

In some embodiments, to alleviate the issues described above and others, a CDN service that enables the dynamic placement of content distributions across PoPs of a CDN is described herein. According to some embodiments, the CDN service includes a distribution characterization component, a distribution routing table compiler, and a modified DNS server, among other components. This service obtains streams of access logs from PoPs of the CDN and outputs, in real time, estimations of characterization data for distributions accessed via the PoPs (e.g., in terms of requests per second, bytes transferred per second, and unique bytes requested for each distribution and for each PoP group of the CDN). As used herein, a PoP group is used to refer to a collection of PoPs with similar network characteristics, often located within a same geographic area such as a city or metropolitan area. In some embodiments, the CDN service uses the characterization data to assign distributions to particular PoPs of a PoP group such that the PoPs maintain similar load overall in the three dimensions mentioned above (requests per second, bytes transferred per second, and unique bytes requested). The CDN service generates routing data based on these assignments, including a distribution routing table that maps particular distributions to particular PoPs of each PoP group. A DNS service associated with the CDN service uses the generated routing data to resolve requests for particular distributions to particular PoPs, as described in more detail herein.

As indicated above, the dynamic distribution placement processes described herein are configured such that, for users in a same geographic area or that otherwise access a same set of PoPs, requests for content associated with particular distributions are routed to particular PoPs of a PoP group. By placing content associated with particular distributions at particular PoPs of a PoP group, the CDN service makes better use of the total available cache space available in PoP group, among other benefits.

FIG. 1 is a diagram illustrating an environment that includes an analytics service and a DNS service that enable the dynamic placement of distributions in a CDN according to some embodiments. In FIG. 1, a DNS service 102 (including a DNS resolver 104), an analytics service 106, and other components are illustrated that implement a system that dynamically places distributions at various PoPs of a CDN. The DNS resolver 104, analytics service 106, and other illustrated components each may be implemented using software executed by one or more computing devices, as computing hardware, or as a combination of both. In some embodiments, the DNS resolver 104 is implemented in a centralized manner, though in other embodiments the DNS resolver 104 is implemented in a distributed manner using multiple computing devices in one or multiple locations.

The DNS resolver 104 may be a part of a provider network 100 and implement aspects of a DNS service 102. The DNS service 102 may be, for example, a highly available and scalable cloud DNS web service that gives developers and organizations a reliable way to route end users to internet applications by translating domain names into the numeric network addresses that computing systems use to connect to each other. The DNS service 102 may be an authoritative DNS service that can operate to connect user requests to infrastructure running in the provider network 100, such as compute instances of a hardware virtualization service, virtual load balancers, object stores, etc., and may be used to route users to infrastructure outside of the provider network 100. The DNS service 102 may also implement DNS health checks to route traffic to healthy endpoints or to independently monitor the health of applications and its endpoints. A DNS service 102 may also manage traffic globally through a variety of routing scheme types, including latency-based routing, Geo DNS, geo-proximity, round robin, weighted round robin, etc., which can be combined with DNS failover techniques in order to enable a variety of low-latency, fault-tolerant architectures.

A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., a user 108) use electronic devices (e.g., a client electronic device 146) to interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network 100 may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown, a provider network 100 includes one or more points of presence (PoPs) 118A-118M to facilitate content distribution by caching content closer to end users (e.g., the provider network 100 is operating a CDN). These PoPs, which may be referred to as one type of "edge location" of the provider network 100, are typically geographically dispersed across cities, states, geographic areas, countries, etc. Customers of the provider network may host their content within the provider network, and the provider network can facilitate the distribution of that content to the customers' users through use of the PoPs. Thus, a user's request for content may be routed to a proxy server within a PoP that is geographically proximate to the source of the request, and the proxy server fulfills the request from content cached within the PoP, if available.

PoPs 118 thus represent geographically dispersed portions of the provider network 100, each capable of serving cached content to end users. Such content can include, for example, the web site of a customer of the operator of the provider network 100, a set of audiovisual files, streamed content, etc. For example, Company A can host its website—www.companya.com—with the provider network 100. The website content, e.g., text, images, scripts, video, markup, or other data, may be stored in a content origin data store 112. In some embodiments, the content origin data store 112 is a volume (or "bucket" or "folder") of a storage service that provides data storage resources (e.g., object storage, block-level storage, data archival storage, databases and database tables, etc.) using non-volatile storage media such as solid-state drives (SSDs). The content origin data store 112 may serve as the content source for caching by the PoPs 118, though additionally or alternatively, one or more servers 114 (e.g., web servers, which here are executed by one or more server computing devices 116, which may or may not be within the provider network 100) may also act as a content source. In some embodiments, the content origin data store 112 is located within one of the PoPs 118, though in some embodiments the content origin data store 112 or server(s) 114 may be located in a "region" 148 of the provider network 100 or within an entirely different network altogether.

In some embodiments, once the content origin sources are registered with the CDN service, the CDN service generates a domain name that can be used to distribute content from the registered origin servers via the CDN service. For example, a user can include the CDN service-generated domain name, or a custom CNAME alias, in a web application, media player, or other application. Each request from a client device made using the CDN service-generated domain name, or a user's custom CNAME alias, is then routed to a PoP that is best suited to deliver the requested content with the highest performance. Upon receiving such a request, a PoP first attempts to serve the request with a local copy of the requested content. If a local copy of the content is not available (e.g., because it is the first time the content has been requested, or because the content was removed from the PoP due to inactivity), the PoP obtains a copy from the registered origin. Once retrieved, a copy of the distribution content is available at the PoP for future requests.

A user 108 can initiate a request for content hosted by (or otherwise made accessible by) the provider network 100, for example, by commanding a web browser application executing on a client electronic device 146 to issue a HyperText Transfer Protocol (HTTP)-based request for a resource, utilizing another type of application that can fetch remote resources via HTTP, etc. Examples of such client electronic devices 146 include personal computers (PCs), cell phones, handheld messaging devices, laptop computers, set-top boxes, personal data assistants, electronic book readers, wearable electronic devices (e.g., glasses, wristbands, monitors), and the like.

As one example, the user 108 may have typed a portion of a Uniform Resource Locator (URL) or, more generally, a Uniform Resource Identifier (URI), including a full or partial domain (e.g., "www.example.com") into the address bar of a browser, clicked on a hyperlink displayed in a browser, opened another type of application, etc. To obtain this resource, the client electronic device 146 may issue a DNS address lookup request 120 that identifies the domain (www.example.com) to a DNS resolver server 122, which may be managed by the user's ISP—such as a cable Internet provider, a DSL broadband provider, or corporate network—or by another entity offering DNS lookup services.

Assuming the DNS resolver server 122 is unaware of the mapping between the provided domain name and a network address associated therewith (e.g., it does not have such a mapping entry in its cache), the DNS resolver server 122 forwards the request to resolve www.example.com to a non-illustrated DNS root name server, which may return identifiers of one or more name servers for the top level domain (TLD), and the DNS resolver server 122 may again forward the request to one of the non-illustrated TLD name servers for ".com" domains. The name server for ".com" domains may then respond to the request with the names/ network addresses of one or more name servers (e.g., DNS resolver 104) of the DNS service 102 that are associated with the requested "example.com" domain. Thus, the DNS resolver server 122 chooses a name server (e.g., DNS resolver 104) and forwards the request for "www.example.com" to that name server. Based on receipt of this forwarded request, the DNS resolver 104 looks in the "example.com" hosted zone for the "www.example.com" record, obtains an associated value—such as the IP address for a web server (e.g., 192.0.2.44)—and returns this IP address to the DNS resolver server 122.

In some cases, this resolution (or identification of an IP address for a domain) may be based on an estimate or approximation of the location of the client electronic device 146 (e.g., using an IP address of the client, when available, or an identifier of the DNS resolver server 122). Thus, the DNS resolver 104 can provide a network address of an entry point of a PoP 118 that can offer the user the best performance (e.g., due to geographic proximity to the client electronic device 146). For example, PoP 118A might be located in San Francisco, Calif., whereas PoP 118H might be located in Chicago, Ill. Assuming the client electronic device 146 is estimated to be in Oakland, Calif. (or in Northern California, the Bay Area, etc.), the DNS resolver 104 may return a network address associated with PoP 118A due to it being more geographically close to the inferred or determined location associated with the client device.

Accordingly, in some cases, DNS resolution (e.g., the resolution of a domain name into a network address) may be domain-name independent. Thus, requests for any domain name associated with a content delivery system can be responded to with a network address of any PoP of the CDN. This assumption holds, for example, where all PoPs of a content delivery system operate to provide access to any content associated with the content delivery system. Thus, any PoP can function to service requests for any content of the content delivery system. However, it is to be appreciated that embodiments described herein may optionally be deployed such that requests for certain domains may resolve to particular PoPs, which can beneficially enable cache sharding in that some or all objects of a distribution can be provided via a particular set of one or more POPs instead of being potentially duplicated in multiple POPs in a nearby geographic location. In this manner, in some embodiments objects of a single distribution may be sharded by causing certain objects of the distribution to be provided via a first POP (but not via a second POP) in an area while other objects of the same distribution are provided via the second POP (but not via the first POP). Similarly, in some embodiments, different distributions can be sharded across a set of POPs by, for example, causing objects belonging to a particular distribution to be provided via a first POP (or set of POPs) while objects of a different distribution are provided through a different POP (or different set of POPs)

Returning to the example above, the DNS resolver server 122 now has the IP address that the client electronic device 146 requested and returns that value to the client electronic device. The DNS resolver server 122 may also cache the IP address for "example.com" for some amount of time so that it can respond more quickly the next time a client needs to resolve "example.com."

The client electronic device 146 then sends a resource request 150 to obtain "www.example.com" to the network address (e.g., 192.0.2.44) that it obtained from the DNS resolver server 122, which may correspond to a PoP 180A location, a server (e.g., a compute instance), a storage server data store (e.g., content origin data store 112) configured as a website endpoint, etc. The web server or other computing resource at 192.0.2.44 may then return the requested resource (e.g., a web page for www.example.com) to the client electronic device 105, which may then act upon the resource (e.g., a web browser displays the page).

At a PoP 118, a load balancer (not shown) may receive and then route the request to a proxy server 124 executed by one of a plurality of edge computer systems 128A-128N (e.g., electronic server devices) that facilitate content distribution from the PoP. Upon receipt of the request (e.g., for Company A's web page), the proxy server 124 may obtain configuration data associated with the request. Note that since the proxy server 124 may be handling requests for many different customers of the provider network 100, there may be separate configuration data for each customer, for each resource, and/or for groups of resources. In some embodiments, the proxy server 124 fetches the configuration data from another service (not shown) or cache within the PoP 118, or within a region 148 of the provider network 100. For example, the proxy server 124 in some embodiments sends a message to a database frontend with the URI of the request to retrieve the associated configuration data.

The obtained configuration data, in some embodiments, includes data used to locate the resource or content needed to fulfill the request from the client electronic device 146 (e.g., the location of the "index.html" resource within the provider network 100). Based on the configuration data, the proxy server 124 can request the resource from a PoP content cache server 126 that is backed by the content origin data store 112 or server(s) 114. If the PoP content cache server 126 already has the resource cached (e.g., stored as part of the distribution data 130), it can return the resource to the proxy server 124. If not, the PoP content cache server 126 can fetch the resource from the content origin data store 112 or server 114 and, once obtained, return the resource to the proxy server 124 (and optionally also cache the resource as part of distribution data 130 at that time). In some embodiments, the PoP content cache server 126 may return an indication of a resource miss to the proxy server 124 to either notify the proxy server 124 that the resource is being fetched from the content origin data store 112 or server 114. Once the proxy server 124 has obtained the resource via the PoP content cache server 126, the proxy server 124 returns the resource (e.g., via one or more HTTP response messages) to the client electronic device 146 to fulfill the request. In some embodiments, the PoP content cache server 126 further generates and sends log data 134 reflecting information about the request to a data monitoring service 136. Although FIG. 1 illustrates one variant of PoP-based resource caching and request fulfillment, other CDN architectures are possible.

This process, however, is modified in some embodiments to allow the DNS resolver 104 to route requests for particular distributions (e.g., identified by the domain name included in the DNS address resolution request) to particular PoPs of a PoP group (e.g., to a particular PoP from PoPs 118A-118C of the PoP group 132A). In this manner, the system including the modified DNS resolver 104 can make more efficient use of the cache space and other resources of the PoPs by resolving requests in a manner that reduces duplication of distributions across PoPs that are proximate to one another. For example, in some embodiments, an analytics service 106 of the provider network 100 can monitor requests for particular distributions over time at each of PoP groups 132A-132N (e.g., by analyzing the log data 134) and update the routing data 110 (e.g., a mapping between an object identifier (such as a hash described herein) and a network address/PoP/location) used by the DNS resolver 104 to direct clients to particular locations based on these objects. As indicated above, certain (or all) PoPs may be grouped into one of PoP groups 132 based on their geographic or network proximity to one another. In some embodiments, some PoPs may be unaffiliated with any PoP group (e.g., because there are no other PoPs geographically proximate to those PoPs) or those PoPs may be included as part of a PoP group that includes only a single PoP (e.g., such that the single-member PoP group can be expanded if additional proximate PoPs are added to the CDN).

In some embodiments, segments of a cloud provider network—referred to herein as a provider substrate extension (or "PSE"), which may be an "edge location"—can be provisioned within a network that is independent from the cloud provider network. A cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

One example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a remote/distinct control plane of the cloud provider network.

A further example of a provider substrate extension is a network deployed at a communications service provider location and may be referred to as a "wavelength zone." Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiberoptic, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

Thus, as used herein, the computing resources of the cloud provider network installed as provider substrate extensions are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. As described herein, embodiments can "route" clients to different types of locations, such as PoPs, edge locations, in-region locations, etc.

In FIG. 1, the circles numbered "1"-"7" illustrate an example process for enabling the dynamic placement of distributions at PoPs of a CDN as described herein. In some embodiments, at circle "1," an analytics service 106 (which may be separate from or part of the DNS service 102) obtains log data 134 from the PoPs of the CDN, where the log data reflects requests to access distributions from the various PoPs of the CDN (e.g., based on requests from client electronic devices 146, as described above). For example, in some embodiments, each time a client device requests one or more data objects associated with a distribution from a PoP 118, the PoP 118 generates log data indicating some or all of: a network address of the requesting client device, an identifier of the requested data item and associated distribution, a size of the requested data item, an amount of data (e.g., a number of bytes) transferred to satisfy the request, a time at which the request is received, among other possible information. In some embodiments, the PoPs 118 send the access log data to a data monitoring service 136, the analytics service 106, the DNS service 102, or to another service accessible to the DNS service, as a stream of log entries or periodically in batches for storage and analysis.

In some embodiments, at circle "2," the analytics service 106, DNS service 102, or another service accessible to the DNS service 102, analyzes the log data 134 and generates distribution characterization data 144. In general, the characterization data indicates the "weight" or load of the network traffic associated with each distribution within each PoP group (e.g., in terms of a number of requests per second and a number of bytes transferred per second) and in terms of the amount of unique content associated with each distribution (e.g., in terms of a number of unique bytes of each distribution requested by client devices). In some embodiments, the characterization data 144 is generated periodically (e.g., every 15 minutes) such that the data for each distribution represents the distribution's access pattern over a past one or more time periods. In other embodiments, the characterization data 144 is continuously updated as log data 134 is received.

The amount of log data 134 generated by the PoPs of a CDN often may be significant (e.g., tens of millions of requests per second, or more). In some embodiments, the analytics service 106 aggregates the received log data in real time using a multi-staged process (e.g., a multi-stage MapReduce pipeline). In some embodiments, the first stage of the pipeline (e.g., performed by a collection of servers operating in parallel) receives the raw log data 134 and aggregates the data per distribution and per PoP group in terms of a number of requests received for each distribution, an amount of bytes transferred for each distribution, an amount of unique bytes from a distribution that have been requested, etc. In some embodiments, the servers implementing the first stage of the pipeline then publish the aggregated data to a data stream of a data stream service, where each data item (e.g., each log entry) is associated with a key corresponding to the associated PoP group and distribution. Data items associated with particular PoP groups and distributions are published to a same shard of the data stream. The data stream then publishes the data from each shard using an identifier of the PoP group as the key resulting in a list of all distributions for a PoP group. In some embodiments, a consumer of the published data obtains the distribution list and ranks the distributions according to the characterization data associated with the distributions (e.g., based on a combination of the requests per second, bytes per second, and unique bytes requested for each distribution, possibly as a weighted combination). In some embodiments, the ranking of distributions can further take into account various other popularity measurements generally indicating an amount of network traffic and PoP load caused by particular distributions over time.

Figure 2:
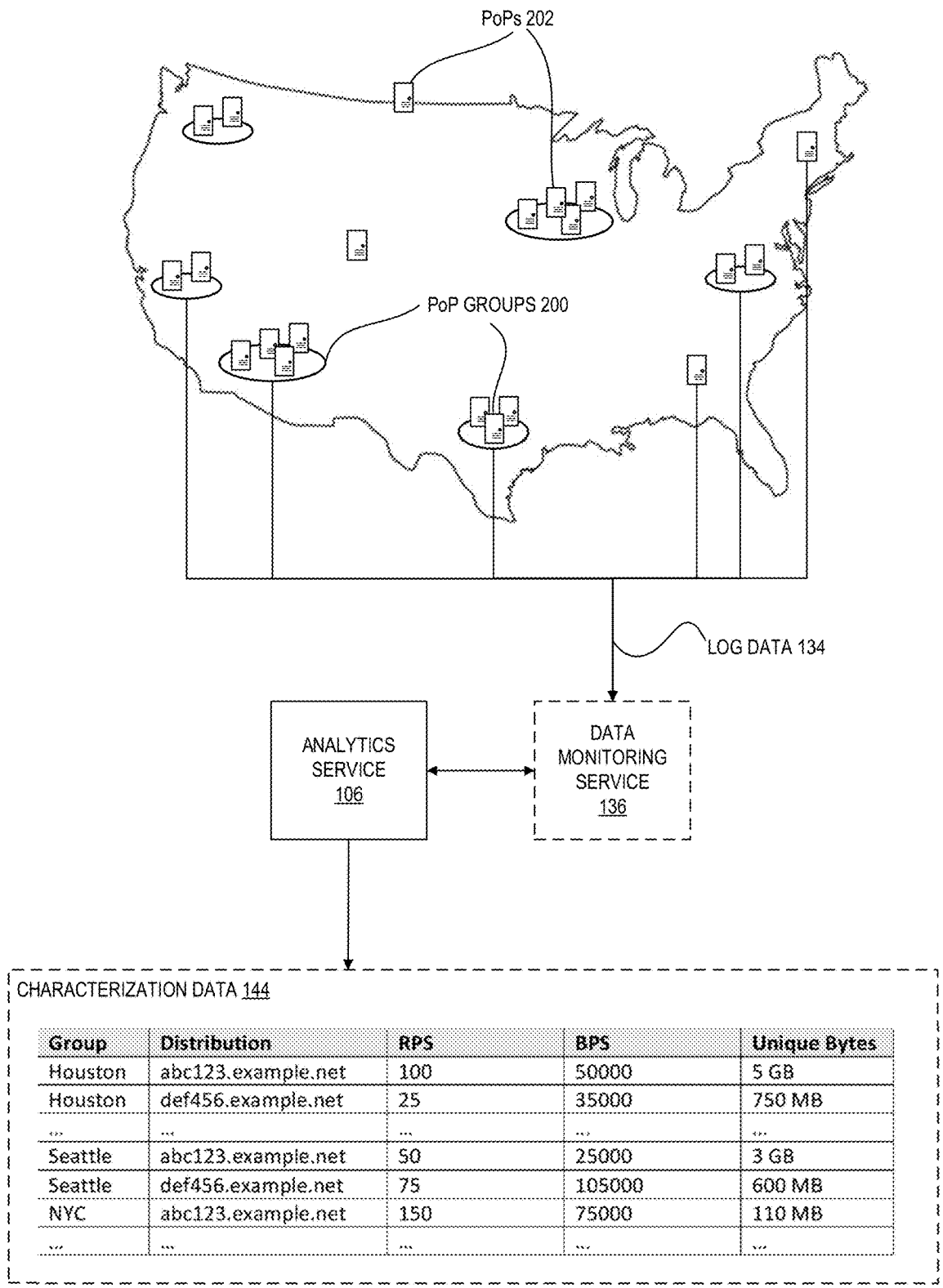
FIG. 2 is a diagram illustrating an analytics service obtaining log data from PoPs of a CDN and using the log data to generate characterization data for content distributions accessed via the PoPs according to some embodiments.

FIG. 2 is a diagram illustrating an analytics service 106 obtaining log data from PoPs 202 of a CDN and using the log data 134 to generate characterization data 144 for distributions accessed via the PoPs according to some embodiments. As illustrated, a geographic area in which a CDN operates includes many PoPs (e.g., including PoPs 202), some of which may be grouped in a PoP group of a plurality of PoP groups representing PoPs in a same defined geographic area or that are otherwise proximate to one another (e.g., PoP groups 200, one which includes a group of PoPs in the Los Angeles, Calif. area and another including a group of PoPs in the Houston, Tex. area). During operation, the PoPs 202 receive requests for data objects associated with various distributions managed by the CDN and emit log data 134, as described above. The analytics service 106 may receive the log data 134 directly or may access the log data via a data monitoring service 136 of the provider network 100 to which the log data 134 is sent. In some embodiments, using the log data 134, the analytics service 106 generates characterization data 144 for distributions accessed via the PoPs. In the example shown in FIG. 2, the resulting characterization data 144 includes, for each distribution and for each PoP group (e.g., for each of the Houston PoP group, the Seattle PoP group, the New York City PoP group, etc.), an identifier of a distribution (e.g., possibly a hash of a domain name identifying a distribution), a number of requests per second (RPS) during the most recently measured time period, an amount of bytes per second (BPS) transferred, and a number of unique bytes associated with the distribution that have been requested by client devices.

In some embodiments, a number of unique bytes requested for each distribution is estimated based on information contained in the log data 134. For example, a log entry associated with each request received by a PoP may include a cache key for the requested data object from the distribution. The analytics service 106 uses the cache key to track which parts of distributions have been requested (e.g., by storing the data in a HyperLogLog data structure). In some embodiments, the information about the requested parts of a distribution is aggregated across all PoPs of a PoP group to obtain an estimated number of unique bytes requested for a particular distribution within a particular PoP group.

Referring again to FIG. 1, in some embodiments, at circle "3," the analytics service 106 periodically uses the distribution characterization data 144 generated at circle "2" to generate or modify routing data 110 (including data stored as part of a primary routing table 140 and one or more distribution routing table(s) 142). In some embodiments, a primary routing table 140 includes entries mapping DNS resolver network addresses to either a PoP (e.g., for DNS resolvers in geographic areas that are not close to a PoP group) or including a reference to a distribution routing table 142 (e.g., for DNS resolvers in a geographic area associated with a PoP group). In some embodiments, a distribution routing table 142 includes entries that map particular distributions to one or more particular PoPs of PoP groups, such that requests associated with DNS resolvers in a same geographic area for a given distribution are routed to a same PoP, or to a same set of PoPs, of an associated PoP group. In some embodiments, distributions are each mapped to a vector of one or more PoPs of a PoP group, where some distributions may be mapped to only one PoP of a PoP group, while others are mapped to two or more PoPs, depending on the load associated with each of the distributions (e.g., where distributions associated with relatively higher loads are assigned to relatively more PoPs of a PoP group). In some embodiments, a PoP vector may be weighted vector such that requests for a particular distribution are resolved to particular PoPs of a PoP vector using a probabilistic function based on the assigned weights (e.g., where the assigned weights may be based on information about the resources available at each of the PoPs).

In some embodiments, to generate the routing data 110, the analytics service 106 identifies a first set of distributions that are to be assigned to multiple PoPs (or possibly all PoPs) of the CDN due to their "weight" as reflected by the characterization data 144 (e.g., in terms of requests per second, bytes transferred per second, and cache width usage, or any combination thereof). For example, large and heavily accessed distributions may be assigned to many or all PoPs of a CDN, including across PoPs of each PoP group, so that failovers from one PoP to another do not cause heavy traffic patterns for particular distributions to encounter cold caches on the failover PoP. The analytics service 106 thus identifies these heavily weighted distributions and assigns the distributions to many or all of the PoPs of the CDN (e.g., using a PoP vector as described above). In some embodiments, to identify this first set of distributions to be stored across multiple PoPs, the analytics service 106 identifies a set of distributions that collectively are responsible for half of the load of any PoP group of the CDN, although any threshold may be defined to identify the "heavy" distributions to associate with many or all of the PoPs of the CDN.

In some embodiments, the analytics service 106 identifies a second set of distributions that are to be dynamically placed at one or more particular PoPs of each PoP group. In some embodiments, the analytics service 106 assigns these distributions to particular PoPs of each PoP group using a bin packing algorithm (or, more generally, any allocation algorithm or heuristic) that takes as input the characterization data 144 and information about the capacity available at each PoP (e.g., in terms of storage resources, network resources, computing resources, or any combination thereof). In general, the bin packing algorithm is used to allocate particular distributions to particular PoPs in a way that distributes the "weight" or load associated with the distributions, as described above, across the PoPs of each PoP group but without exceeding any PoPs total available capacity.

Figure 3:
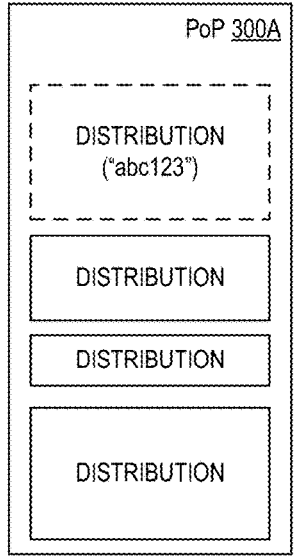
FIG. 3 is a diagram illustrating an analytics service using a bin packing algorithm to assign particular distributions to particular PoPs of a PoP group according to some embodiments.
Figure 3:
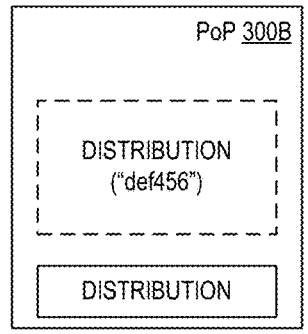
Figure 3:
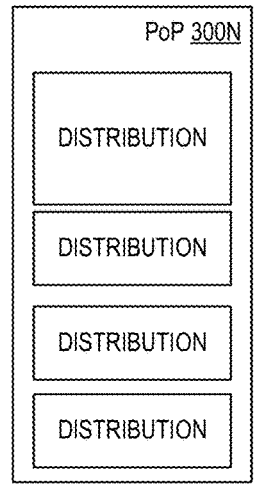

FIG. 3 is a diagram illustrating an analytics service using a bin packing algorithm or other allocation process to assign particular distributions to particular PoPs of a PoP group according to some embodiments. In the example shown in FIG. 3, the analytics service 106 uses characterization data 144 to allocate various distributions (e.g., including distributions identified by labels "abc123" and "def456") among a set of PoPs 300A, 300B, . . . , 300N. Each of the PoPs illustrated in FIG. 3 is shown with different dimensions to represent differing amounts of capacity associated with each of the PoPs in terms of storage, networking, compute, or combinations thereof. As shown, the distribution-to-PoP mapping 302 includes assigning the distribution identified by the label "abc123" to the PoP 300A (and possibly to one or more other PoPs of the PoP group) and assigning the distribution identified by the label "def456" to PoP 300B, such that the distributions assignments balance the distributions according to their characterization data across the available capacity of the PoPs.

As indicated above, the analytics service 106 may generate and update the routing data 110 periodically (e.g., every 15 minutes or any other time period) as additional log data 134 is received from PoPs such that the routing data 110 reflects recent usage patterns associated with each distribution. In some cases, the updated routing data 110 may change assignments of distributions from one PoP to another within a PoP group. However, shifting assignments of distributions from one PoP to another can often be an expensive operation. For example, if a distribution is reassigned from one PoP to another, the new PoP likely will not have the distribution in its cache and need to obtain data objects for the distribution from one or more origin sources—shuffling a large number of distributions can thus cause significant amounts of cache rewarming among the PoPs of a PoP group, which can negatively impact the performance of the PoP group generally.

In some embodiments, to increase the stability of the distribution-to-PoP assignments across separate, periodic runs of the processes described herein, the analytics service 106 uses rendezvous or highest random weight (HRW) hashing, or any other consistent hashing algorithm, as part of the bin packing process, where the algorithm is performed in a bounded and greedy fashion. The use of the rendezvous hashing algorithm, for example, takes as input an identifier of the distribution and a set of weights to be assigned to each PoP (e.g., corresponding to each PoP's capacity) and outputs an ordered list of PoPs, where a distribution is assigned to the first PoP in the list that can support the distribution based on its available capacity. Because the output of the rendezvous hashing algorithm is stable on successive runs of the algorithm, each distribution is likely to be assigned to a same PoP at each successive run of the processes assuming the PoP can still support the distribution (e.g., the distribution identified by the label "abc123" in FIG. 3 is likely to remain on PoP 300A over successive runs of the bin packing algorithm). As indicated, the analytics service 106 further performs the assignment of distributions to PoPs in a greedy fashion, meaning that the bin packing is performed on distributions in an ascending order based on size, such that the largest distributions are assigned before smaller distributions.

In some embodiments, there remains a third set of smaller distributions that are not included in the distribution routing table data, e.g., where the third set may include smaller distributions that are below a threshold "weight" defined by the characterization data, where such distributions can be assigned to any PoP of a PoP group without significant impact on the PoP. In some embodiments, the DNS service 102 is configured to assign such distributions a particular PoP of a PoP group at the time at which a request is received for such distributions by using a rendezvous hashing algorithm, as described above. For example, if the DNS service 102 receives a request to resolve a hostname identifying a distribution that is not found in the distribution routing table 142, the service can execute the rendezvous hashing algorithm using the distribution identifier and PoP weights as input and assign the distribution to the first PoP in the resulting list.

Figure 4:
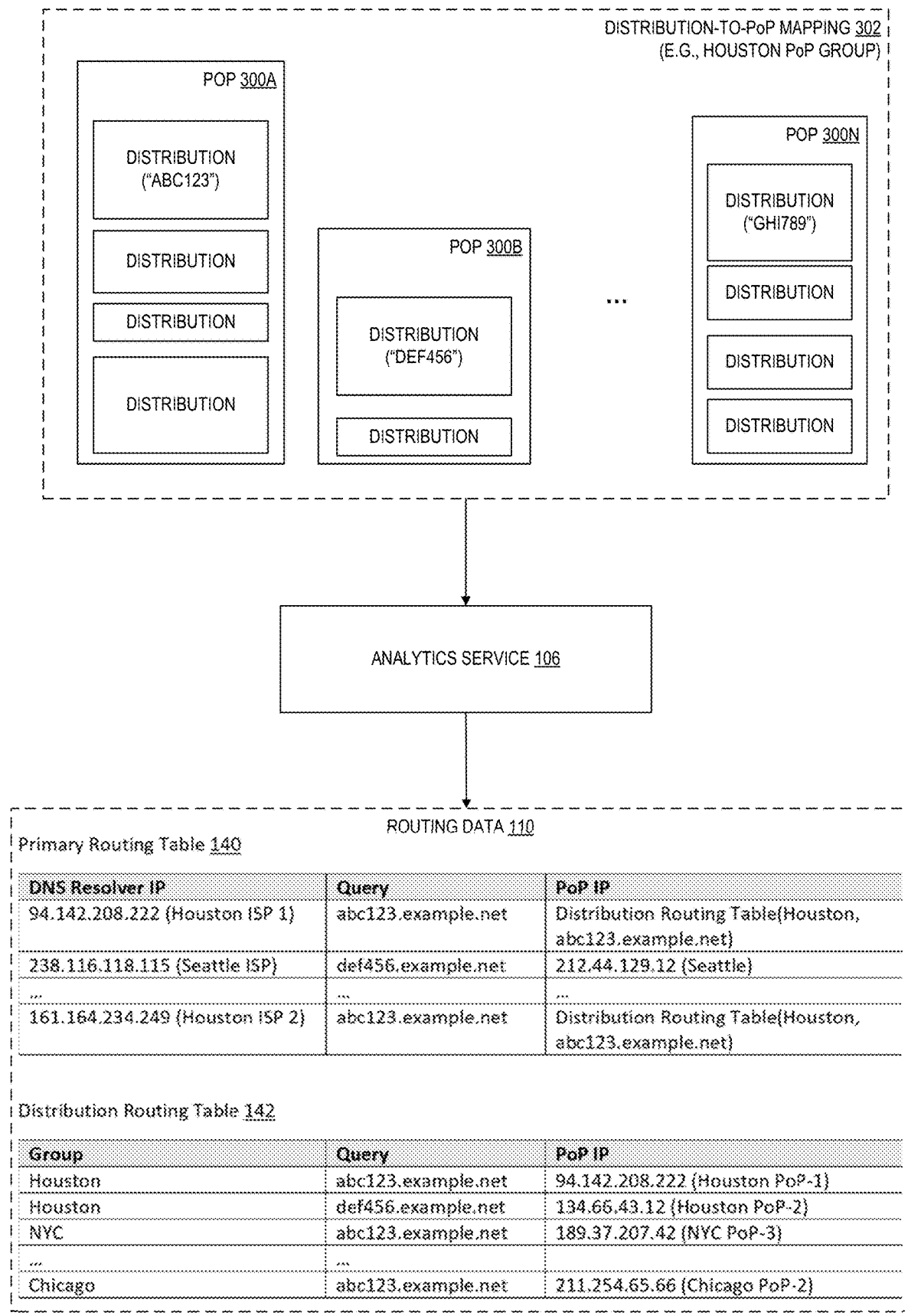
FIG. 4 is a diagram illustrating an analytics service using the results of the bin packing algorithm to generate routing data including a primary routing table and distribution routing table according to some embodiments.

In some embodiments, the result of the processes performed by the analytics service 106 described above results in a mapping between distributions and PoPs for each PoP group. FIG. 4 is a diagram illustrating an analytics service 106 using the results of a bin packing algorithm to generate routing data including a primary routing table and a distribution routing table according to some embodiments. As shown, the analytics service 106 uses the distribution-to-PoP mapping 302 to generate routing data 110, including data for a primary routing table 140 and a distribution routing table 142. As illustrated, the primary routing table 140 includes some entries mapping a DNS resolver network address to a particular PoP of the CDN, e.g., in geographic areas that are not associated with a PoP group or that include a single-member PoP group. The primary routing table 140 further includes entries that associate a DNS resolver network address to a reference to the distribution routing table 142, e.g., for DNS resolvers that are located in a geographic area associated with a PoP group. The distribution routing table 142 then includes entries that map particular PoP groups (e.g., a Houston, Tex. PoP group, a New York City PoP group, etc.) and particular distributions (e.g., a "abc123" distribution or a "def456" distribution) to one or more particular PoPs of the corresponding PoP group. As illustrated in the example routing data 110 in FIG. 4, requests from different DNS resolvers in the Houston, Tex. area for the same distribution "abc123" are each directed to the distribution routing table and ultimately resolved to a same PoP in the Houston, Tex. PoP group (e.g., "Houston PoP-1"). In some embodiments, and as described above, the resolution of a distribution associated with two or more PoPs of a PoP group to a particular PoP can include using a probabilistic function and optionally weights associated with each PoP of an associated PoP vector to select a particular PoP for a particular request.

Referring again to FIG. 1, in some embodiments, at circle "4," the analytics service 106 sends the routing data 110, including the primary routing table and the distribution routing table(s), to the DNS service 102 for use by DNS resolver(s) 104.

In some embodiments, at circle "5," the DNS service 102 receives a DNS query from a client electronic device 146 requesting to access one or more data objects from a distribution. For example, the request may include a hostname identifying the distribution as part of the hostname (e.g., a DNS query requesting resolution of the "abc123.example.net" domain includes an identifier of a distribution associated with the "abc123" label).

In some embodiments, at circle "6," a DNS resolver 104 of the DNS service 102 uses the routing data 110, including the primary routing table 140 and a distribution routing table 142 to resolve a hostname specified in the request to a network address associated with a particular PoP of a PoP group and sends a DNS response including the network address of the particular PoP. As illustrated above in FIG. 4, the DNS resolver 104 may first locate an entry including a network address associated with the requesting DNS resolver server 122 in the primary routing table 140 and, if the located entry includes a reference to the distribution routing table 142, locate an entry in the distribution routing table 142 including an identifiers of the PoP group and distribution associated with the request. As indicated above, if the request is associated with a distribution that is not associated with an entry in the distribution routing table 142, the DNS resolver 104 performs a hashing algorithm to identify a PoP from an associated PoP group to use for the request. The resolved network address for the PoP is ultimately returned to the client electronic device 146.

In some embodiments, at circle "7," the client electronic device 146 uses the provided network address to send a resource request 150 to access the data items from the particular PoP of the PoP group. As shown in FIG. 1, the client electronic device 146 sends the request 150 to a PoP 118 of the PoP group 132A based on the DNS result returned by the DNS service 102.

Figure 5:
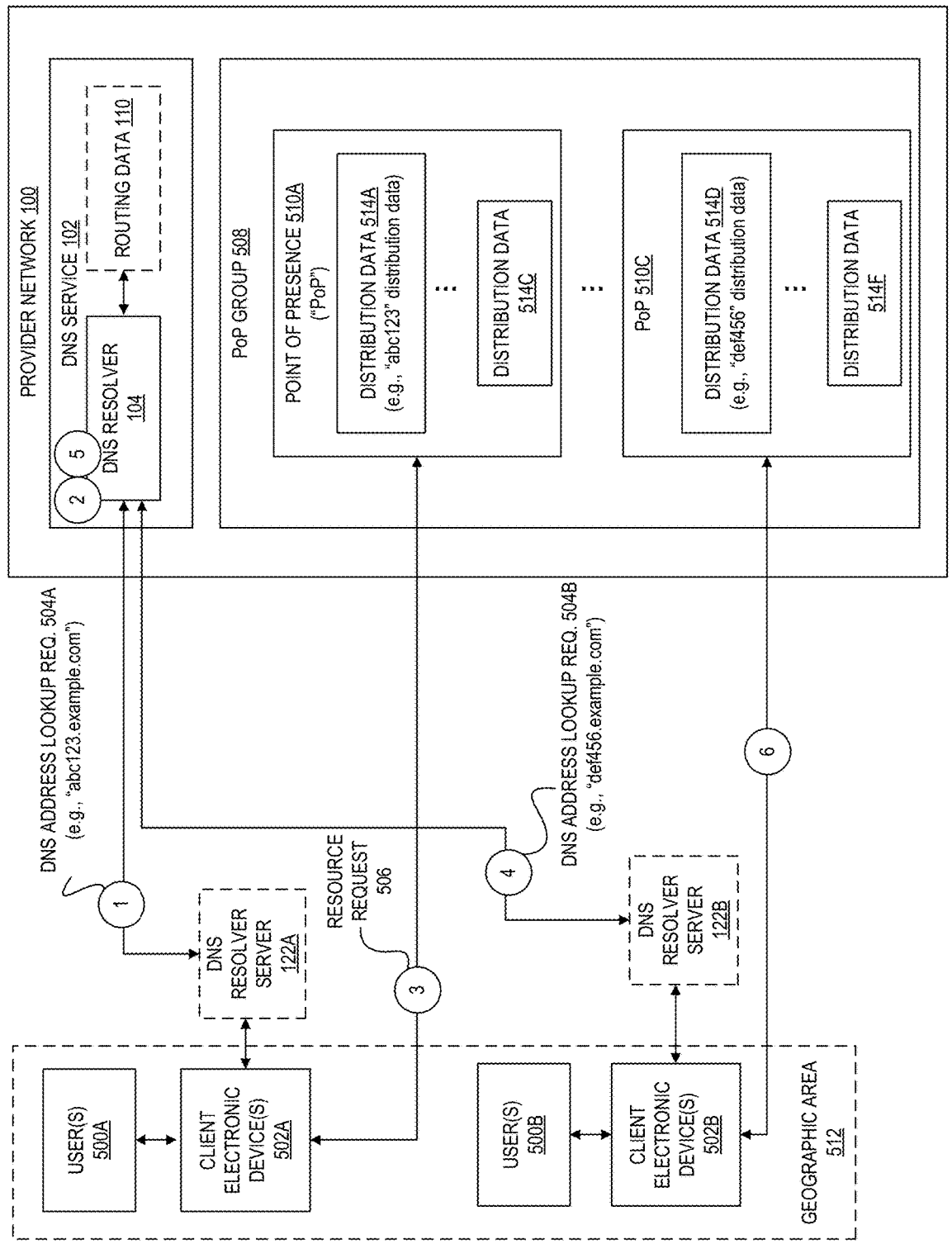
FIG. 5 is a diagram illustrating an environment in which a DNS service uses routing data including a primary routing table and a distribution routing table to resolve DNS queries for particular distributions to particular PoPs of a PoP group according to some embodiments.

FIG. 5 is a diagram illustrating an environment in which a DNS service 102 uses routing data including a primary routing table and a distribution routing table to resolve DNS queries for particular distributions to particular PoPs of a PoP group. In the example of FIG. 5, user(s) 500A and 500B are each located in a common geographic area 512 (e.g., in or near a same city or metropolitan area). DNS requests originating from client electronic device(s) 502A, for example, may be sent to DNS resolver server 122A (e.g., associated with a first ISP providing service in the geographic area 512) while requests originating from client electronic device(s) 502B are sent to a different DNS resolver server 122B (e.g., associated with a different ISP providing service in the geographic area 512).

In some embodiments, at circle "1" in FIG. 5, one or more users 500A use client electronic device(s) 502A to initiate requests 504A for a resource (e.g., resources associated with the domain name "abc123.example.com", where the "abc123" portion of the domain identifies a particular distribution registered with a CDN provided by the provider network 100). In this example, at circle "2," the DNS resolver server 122A uses the routing data 110, as described above, to resolve the requested hostname into a network address associated with the PoP 510A which has been assigned the requested distribution. In some embodiments, the client electronic devices 502A send resource requests 506 to the PoP 510A to access data objects associated with the "abc123" distribution, which is cached as distribution data 514A (along with other distribution data 514A-514C associated with other distributions).

In some embodiments, at circle "4," one or more users 500B use client electronic device(s) 502B to initiate requests 504B for a resource (e.g., resources associated with the domain name "def456.example.com", where the "def456" portion of the domain identifies a different particular distribution registered with a CDN provided by the provider network 100). Here, at circle "5," the DNS resolver server 122A again uses the routing data 110, as described above, to resolve the requested hostname into a network address associated with the PoP 510C, which has been assigned the requested distribution. In some embodiments, the client electronic devices 502B send resource requests to the PoP 510A to access data objects associated with the "def456" distribution, which is cached as distribution data 514D (along with other distribution data 514D-514F associated with other distributions).

Although many of the examples described herein relate to placing distributions at particular PoPs of a PoP group, in other embodiments, similar techniques can be used to intelligently place other types of data objects or entities across PoPs of a CDN. For example, a CDN service may characterize the load of distributions associated with various user accounts of a CDN and place distributions according to an allocation of the total load associated with user accounts across PoPs. In other embodiments, other types of data objects or entities may be placed across other types of load balanced resources using similar load characterization and allocation processes.

Figure 6:
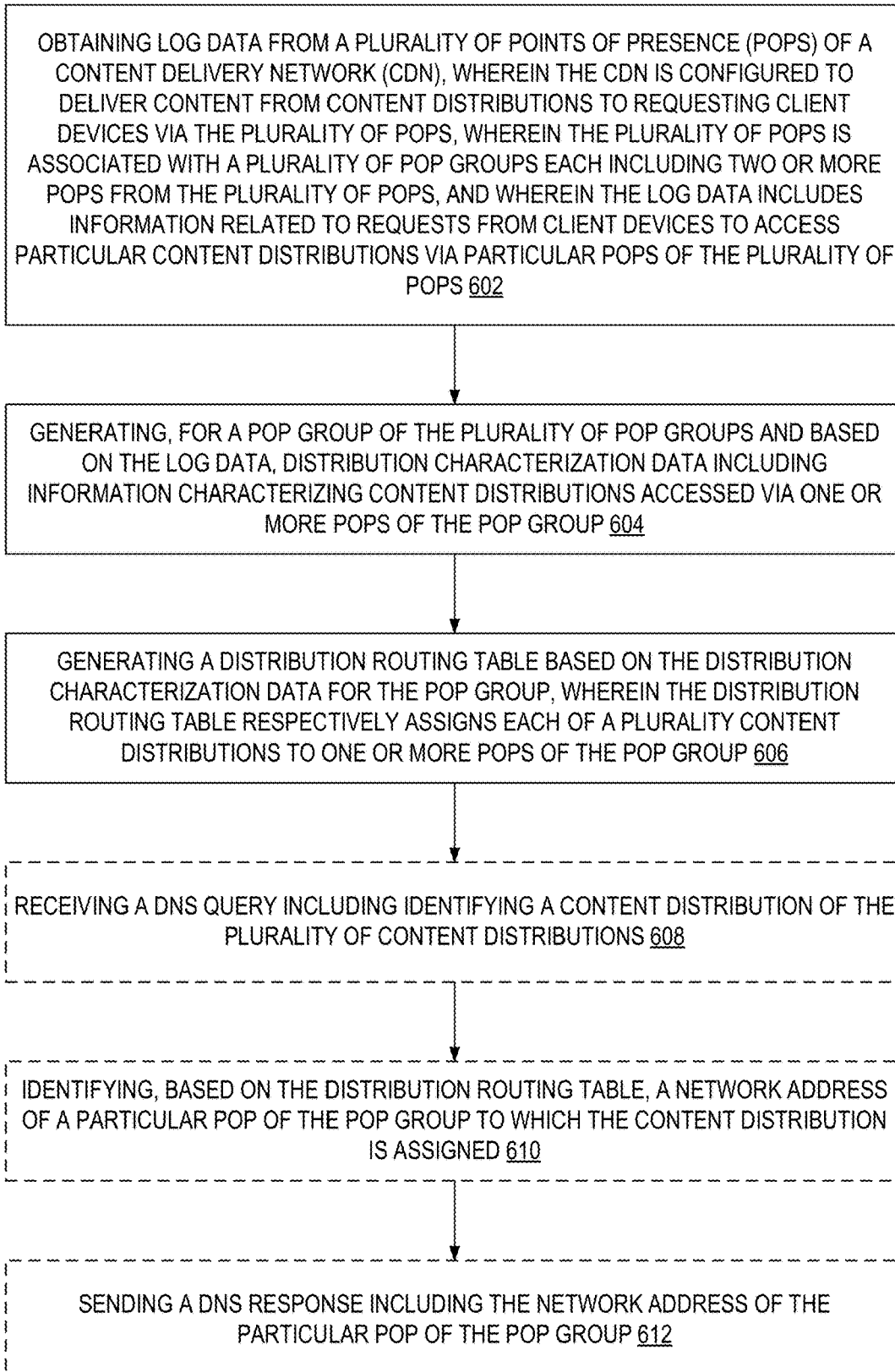
FIG. 6 is a flow diagram illustrating operations of a method for enabling a DNS service to dynamically place distributions at PoPs of a CDN according to some embodiments.

FIG. 6 is a flow diagram illustrating operations 600 of a method for enabling a content delivery network (CDN) service of a cloud provider network to dynamically place content distributions across points of presence (PoPs) within a common geographic area, also referred to herein as a PoP group, in a manner that efficiently uses the resources provided by the PoPs of a PoP group according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a DNS service 102, an analytics service 106, and other components of the other figures.

The operations 600 include, at block 602, obtaining log data from a plurality of points of presence (PoPs) of a content delivery network (CDN), wherein the CDN is configured to deliver content from content distributions to requesting client devices via the plurality of PoPs, wherein the plurality of PoPs is associated with a plurality of PoP groups each including two or more PoPs from the plurality of PoPs, and wherein the log data includes information related to requests from client devices to access particular content distributions via particular PoPs of the plurality of PoPs. In some embodiments, the PoPs of a PoP group are located in a same defined geographic area or are otherwise proximate to one another (e.g., such that the PoPs can be to serve a same set of users with similar network performance characteristics).

The operations 600 further include, at block 604, generating, for a PoP group of the plurality of PoP groups and based on the log data, distribution characterization data including information characterizing content distributions accessed via one or more PoPs of the PoP group.

The operations 600 further include, at block 606, generating a distribution routing table based on the distribution characterization data for the PoP group, wherein the distribution routing table respectively assigns each of a plurality content distributions to a PoP of the PoP group.

The operations 600 further include, at block 608, receiving a DNS query including identifying a content distribution of the plurality of content distributions.

The operations 600 further include, at block 610, identifying, based on the distribution routing table, a network address of a particular PoP of the PoP group to which the content distribution is assigned.

The operations 600 further include, at block 612, sending a DNS response including the network address of the particular PoP of the PoP group.

Figure 7:
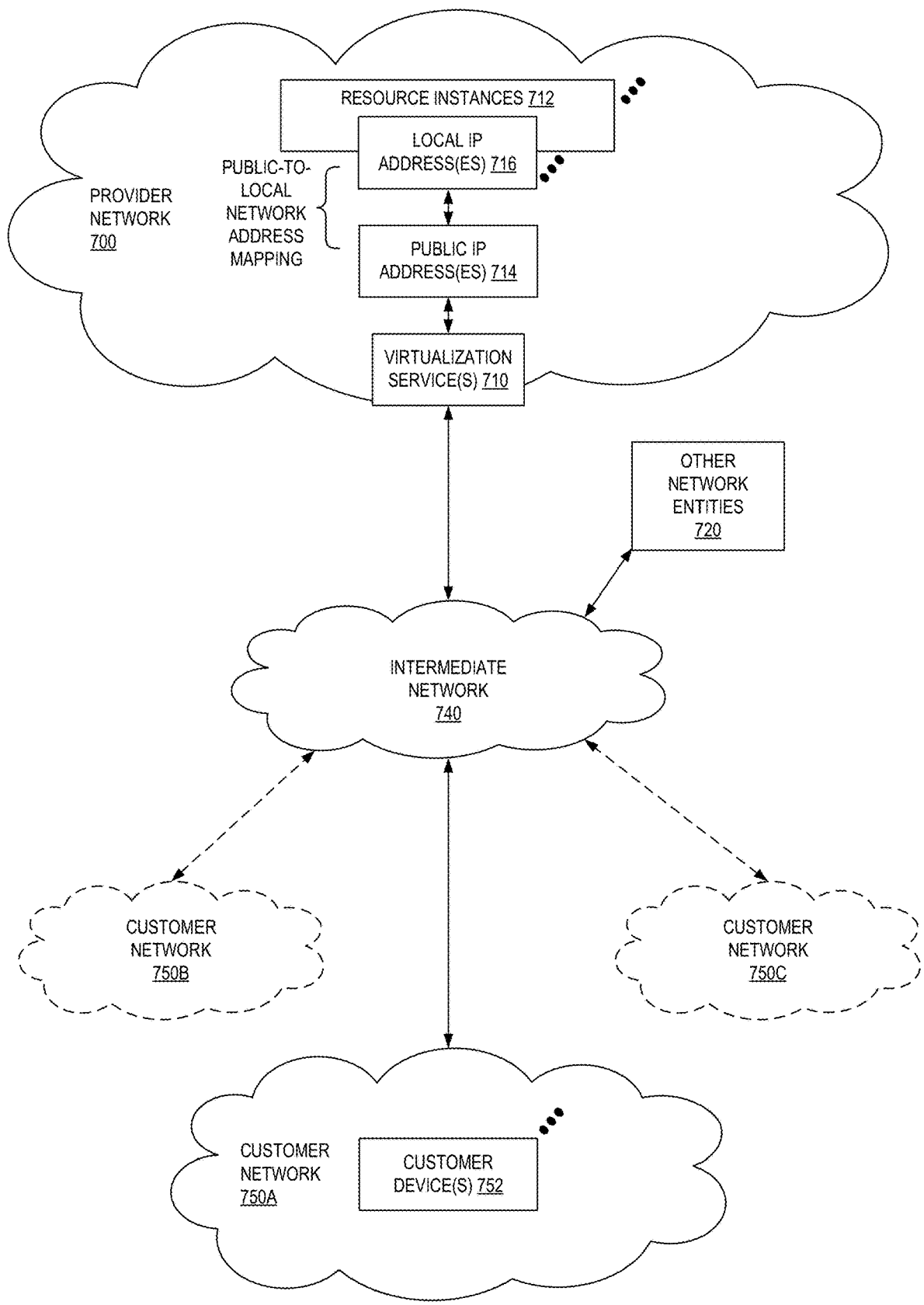
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
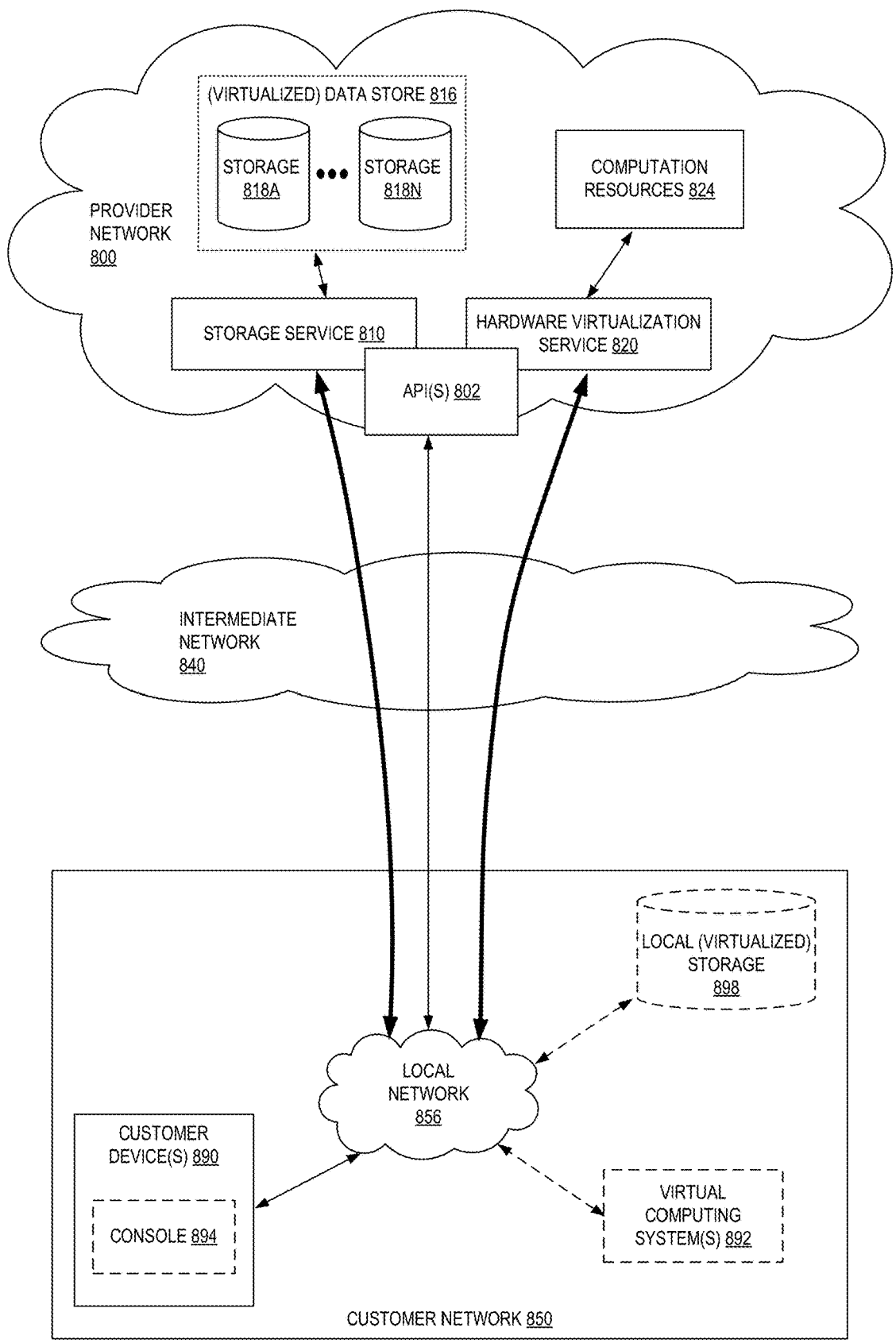
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
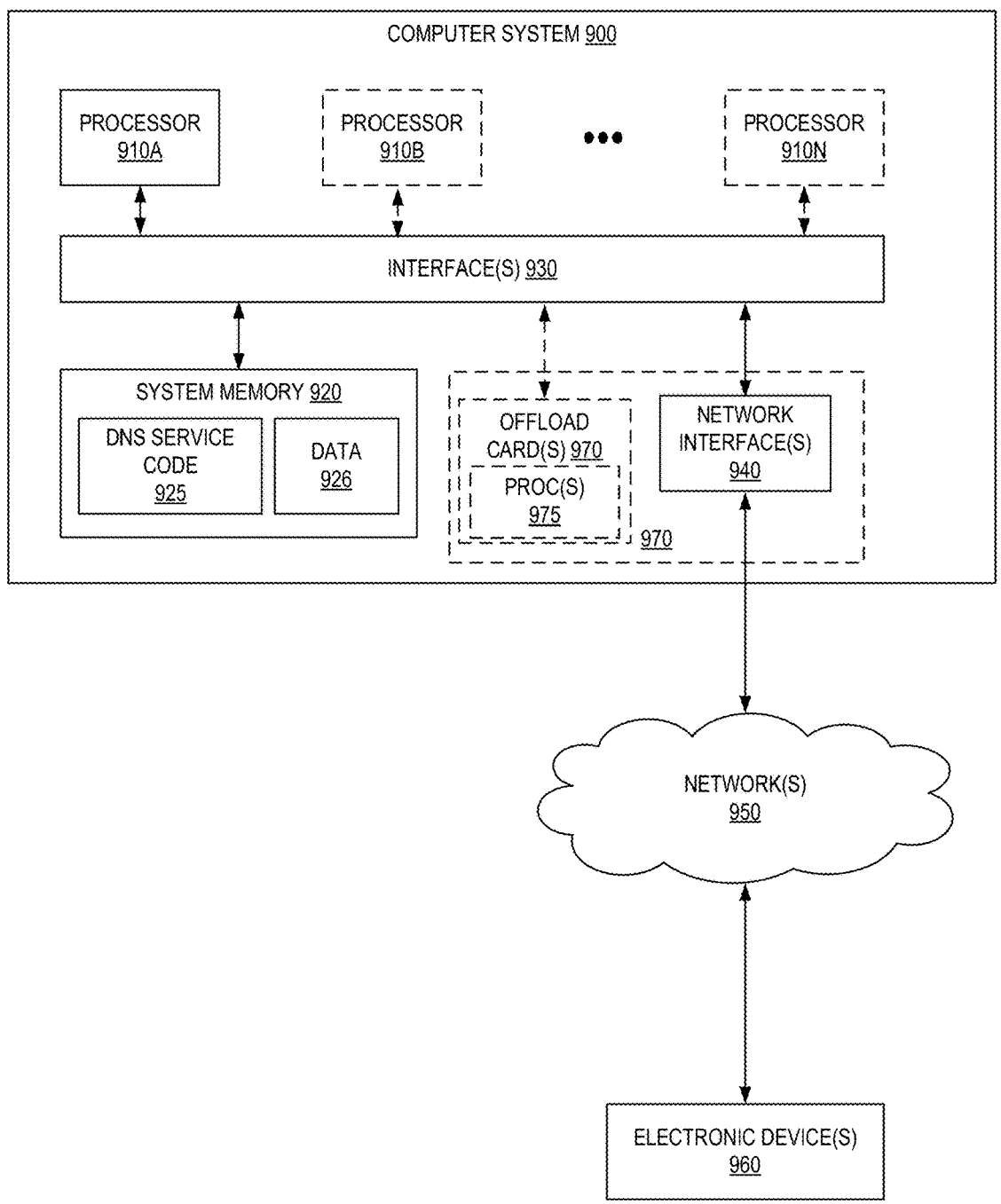
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as DNS service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining log data from a plurality of points of presence (PoPs) of a content delivery network (CDN), wherein the CDN is configured to deliver content from content distributions to requesting client devices via the plurality of PoPs, wherein the plurality of PoPs is associated with a plurality of PoP groups each including two or more PoPs from the plurality of PoPs, and wherein the log data includes information related to requests from client devices to access particular content distributions via particular PoPs of the plurality of PoPs;
    generating, for a PoP group of the plurality of PoP groups and based on the log data, distribution characterization data including information characterizing an amount of resources used by each of a plurality of content distributions accessed via PoPs of the PoP group;
    generating a distribution routing table based on the distribution characterization data for the PoP group, wherein the distribution routing table respectively assigns each of a plurality content distributions to one or more PoPs of the PoP group;
    receiving a DNS query including identifying a content distribution of the plurality of content distributions;
    identifying, based on the distribution routing table, a network address of a particular PoP of the PoP group to which the content distribution is assigned; and
    sending a DNS response including the network address of the particular PoP of the PoP group.

2. The computer-implemented method of claim 1, wherein identifying the network address of the particular PoP of the PoP group to which the content distribution is assigned identified in the DNS query includes:
    identifying, in a primary routing table, a first routing table entry including a network address of a DNS resolver associated with the DNS query, wherein the first routing table entry includes a reference to the distribution routing table; and identifying, in the distribution routing table, a second routing table entry including an identifier of the PoP group, an identifier of the distribution, and the network address of the particular PoP from the PoP group.

3. The computer-implemented method of claim 1, wherein the distribution characterization data includes, for each distribution of the plurality of distributions, values indicating at least one of: requests per second, bytes per second, or unique bytes requested, and wherein the method further includes using a bin packing algorithm to assign each of the plurality of content distributions to a respective PoP from the PoP group based on the distribution characterization data for each of the plurality of content distributions and capacity information for each PoP of the PoP group.

4. A computer-implemented method comprising:

obtaining log data from a plurality of points of presence (PoPs) of a content delivery network (CDN), wherein the CDN is configured to deliver content from content distributions to requesting client devices via the plurality of PoPs, wherein the plurality of PoPs is associated with a plurality of PoP groups each including two or more PoPs from the plurality of PoPs, and wherein the log data includes information related to requests from client devices to access particular content distributions via particular PoPs of the plurality of PoPs;

generating, for a PoP group of the plurality of PoP groups and based on the log data, distribution characterization data including information characterizing a plurality of content distributions accessed via PoPs of the PoP group;

generating a distribution routing table based on the distribution characterization data for the PoP group, wherein the distribution routing table maps each of a plurality content distributions to one or more PoPs of the PoP group; and sending the distribution routing table to a DNS resolver.

5. The computer-implemented method of claim 4, further comprising:

receiving a DNS query including an identifier of a content distribution of the plurality of content distributions;

identifying, based on the distribution routing table, a network address of a particular PoP from the PoP group that is mapped to the content distribution identified in the DNS query; and sending a DNS response including the network address of the particular PoP from the PoP group.

6. The computer-implemented method of claim 5, wherein identifying the network address of the particular PoP of the PoP group to which the content distribution is assigned identified in the DNS query includes:

identifying, in a primary routing table, a first routing table entry including a network address of a DNS resolver associated with the DNS query, wherein the first routing table entry includes a reference to the distribution routing table; and identifying, in the distribution routing table, a second routing table entry including an identifier of the PoP group, an identifier of the distribution, and the network address of the particular PoP from the PoP group.

7. The computer-implemented method of claim 4, wherein the distribution characterization data includes, for each distribution of the plurality of content distributions, values indicating at least one of: requests per second, bytes per second, or unique bytes requested, and wherein the method further includes using a bin packing algorithm to assign each of the plurality of content distributions to a respective PoP from the PoP group based on the distribution characterization data for each of the plurality of content distributions and capacity information for each PoP of the PoP group.

8. The computer-implemented method of claim 4, wherein the distribution routing table includes content distribution-to-PoP mappings for each of the plurality of PoP groups of the CDN.

9. The computer-implemented method of claim 4, further comprising:

receiving additional log data from the plurality of PoPs;

updating the distribution characterization data based on the additional log data to obtain updated distribution characterization data; and periodically updating the distribution routing table based at least in part on the updated distribution characterization data.

10. The computer-implemented method of claim 4, wherein generating the distribution routing table based on the distribution characterization data includes assigning content distributions to PoPs of the PoP group using a consistent hashing algorithm.

11. The computer-implemented method of claim 4, further comprising identifying, based on the distribution characterization data, a set of content distributions collectively exceeding a threshold amount of resources associated with a PoP group of the plurality of PoP groups, wherein content distributions of the set of content distributions are not included in the distribution routing table.

12. The computer-implemented method of claim 5, wherein the DNS query identifying a content distribution is a first DNS query identifying a first content distribution, and wherein the method further comprises:

receiving a second DNS query identifying a second content distribution;

determining that the distribution routing table does not include a routing table entry for the second content distribution; and assigning the second content distribution to a PoP of the PoP group using a consistent hashing algorithm.

13. The computer-implemented method of claim 4, further comprising:

publishing log entries from the log data to a data stream managed by a data streaming service of a cloud provider network, wherein each log entry of the log entries is published to a shard of the data stream based on a PoP group and distribution identified by the log entry; and generating, for each PoP group, a ranking of distributions accessed via a PoP of the PoP group based on the respective characterization data associated with each distribution.

14. The computer-implemented method of claim 4, wherein the characterization data includes an estimated number of unique bytes requested for each content distribution within each PoP group, and wherein an estimated number of unique bytes requested for a particular distribution is estimated based on monitoring cache keys associated with requested data objects from the particular content distribution.

15. A system comprising:

a first one or more electronic devices to implement an analytics service in a multi-tenant provider network, the analytics service including instructions that upon execution cause the analytics service to:

obtain log data from a plurality of points of presence (PoPs) of a content delivery network (CDN), wherein the CDN is configured to deliver content from content distributions to requesting client devices via the plurality of PoPs, wherein the plurality of PoPs is associated with a plurality of PoP groups each including two or more PoPs from the plurality of PoPs, and wherein the log data includes information related to requests from client devices to access particular content distributions via particular PoPs of the plurality of PoPs;

generate, for a PoP group of the plurality of PoP groups and based on the log data, distribution characterization data including information characterizing a plurality of content distributions accessed via one or more PoPs of the PoP group;

generate a distribution routing table based on the distribution characterization data for the PoP group, wherein the distribution routing table respectively assigns each of a plurality content distributions to one or more PoPs of the PoP group;

send the distribution routing table to a DNS resolver of a DNS service; and a second one or more electronic devices to implement the DNS service in the multi-tenant provider network, the DNS service including instructions that upon execution cause the DNS service to:

receive a DNS query including identifying a content distribution of the plurality of content distributions;

identify, based on the distribution routing table, a network address of a particular PoP of the PoP group to which the content distribution is assigned; and send a DNS response including the network address of the particular PoP of the PoP group.

16. The system of claim 15, wherein identifying the network address of the particular PoP of the PoP group to which the content distribution is assigned identified in the DNS query includes:

identifying, in a primary routing table, a first routing table entry including a network address of a DNS resolver associated with the DNS query, wherein the first routing table entry includes a reference to the distribution routing table; and identifying, in the distribution routing table, a second routing table entry including an identifier of the PoP group, an identifier of the distribution, and the network address of the particular PoP from the PoP group.

17. The system of claim 15, wherein the distribution characterization data includes, for each distribution of the plurality of content distributions, at least one of: requests per second, bytes per second, or cache width usage, and wherein the analytics service further includes instructions that upon execution cause the analytics service to use a bin packing algorithm to assign each of the plurality of content distributions to a respective PoP from the PoP group based on the distribution characterization data for each of the plurality of content distributions and capacity information for each PoP of the PoP group.

18. The system of claim 15, wherein generating the distribution routing table includes using a bin packing algorithm to assign distributions to PoPs of the PoP group based at least in part on the distribution characterization data and capacity information for each PoP of the PoP group.

19. The system of claim 15, wherein the analytics service further includes instructions that upon execution cause the analytics service to:

receive additional log data from the plurality of PoPs;

update the distribution characterization data based on the additional log data to obtain updated distribution characterization data; and periodically update the distribution routing table based at least in part on the updated distribution characterization data.

20. The system of claim 15, wherein generating the distribution routing table based on the distribution characterization data includes assigning content distributions to PoPs of the PoP group using a consistent hashing algorithm.

* * * * *